(12) United States Patent
Murphy

(10) Patent No.: US 9,558,162 B2
(45) Date of Patent: Jan. 31, 2017

(54) DYNAMIC MULTIMEDIA PAIRING

(71) Applicant: Timothy Micheal Murphy, Gaithersburg, MD (US)

(72) Inventor: Timothy Micheal Murphy, Gaithersburg, MD (US)

(*) Notice: Subject to any disclaimer, the term of this patent is extended or adjusted under 35 U.S.C. 154(b) by 186 days.

(21) Appl. No.: 14/605,680

(22) Filed: Jan. 26, 2015

(65) Prior Publication Data
US 2015/0135049 A1    May 14, 2015

Related U.S. Application Data

(63) Continuation-in-part of application No. 13/627,048, filed on Sep. 26, 2012, now Pat. No. 9,247,272.

(60) Provisional application No. 61/930,997, filed on Jan. 24, 2014.

(51) Int. Cl.
| | | |
|---|---|---|
| *G06F 17/22* | (2006.01) |
| *G06F 3/0484* | (2013.01) |
| *G06F 3/0488* | (2013.01) |
| *G06Q 30/00* | (2012.01) |
| *G06Q 50/00* | (2012.01) |
| *H04N 21/4788* | (2011.01) |
| *G11B 27/10* | (2006.01) |
| *H04N 21/472* | (2011.01) |

(52) U.S. Cl.
CPC ......... *G06F 17/2235* (2013.01); *G06F 3/0484* (2013.01); *G06F 3/0488* (2013.01); *G06Q 30/00* (2013.01); *G06Q 50/01* (2013.01); *G11B 27/10* (2013.01); *H04N 21/4788* (2013.01); *H04N 21/47205* (2013.01)

(58) Field of Classification Search
CPC .. G06F 17/2235; G06F 3/0484; G06F 3/0488; H04N 21/4788; H04N 21/47205; G06Q 30/00; G06Q 50/01
See application file for complete search history.

(56) References Cited

U.S. PATENT DOCUMENTS

2010/0211199 A1* 8/2010 Naik ....................... G10L 21/00
700/94
2012/0290688 A1* 11/2012 Nandakumar ...... H04L 65/4084
709/219

* cited by examiner

*Primary Examiner* — Kim T Nguyen
(74) *Attorney, Agent, or Firm* — James M. Smedley LLC; James Michael Smedley, Esq.

(57) ABSTRACT

The present invention generally relates to systems and methods for producing mixed media. Specifically, embodiments of the present invention are configured to provide users the ability to play one or more multimedia files and mix the files in real time (live) according to user manipulation of system controls and or manipulation of user defined presets, thus producing a mixed media mashup. Further embodiments of the present invention are configured to allow users to record, save, replay, and share the mixed media mashup.

25 Claims, 8 Drawing Sheets

DYNAMIC MULTIMEDIA PAIRING

CROSS-REFERENCE TO RELATED APPLICATIONS

This application number claims the benefit of U.S. Provisional Application Ser. No. 61/930,997 filed on Jan. 24, 2014, entitled "Dynamic Media Pairing" and pending U.S. Non-provisional application Ser. No. 13/627,048 filed on Sep. 26, 2012 entitled, "Network of Collaborative Online Shows", each of which is herein incorporated by reference in its entirety.

FIELD OF THE INVENTION

The present invention generally relates to systems and methods for producing live multimedia mixes without a traditional mixer. Specifically, embodiments of the present invention are configured to provide users the ability to create, record, and share customized multimedia mixes also known as mashups.

BACKGROUND OF THE INVENTION

Digitization of music and images has democratized content creation, distribution and the way content is shared. Before digitization, only select individuals with access to expensive and cumbersome equipment were able to manipulate media. For example, it was rare for anyone besides a record producer to be able to construct a musical composition out of various vocals and instruments into a desired arrangement. Since a record producer was usually hired by an artist or a record company, the record producer's creation was not owned by him and thus, he was precluded from distributing his creative output. Any attempts at record producing by using readily available equipment such a cassette recorders yielded poor quality.

Digitization has condensed media so that physical manipulation and display of media is no longer required. This means that a significantly greater number of individuals are able to create their own content (or manipulate existing content) and easily share this creation with other individuals using media or multimedia mixers.

However, despite the ease with which individuals can become their own producers or photographers, current media or multimedia mixers are nonetheless inefficient and limiting. For example, traditional audio-video mixers are primarily burdensome. Having separate auxiliary equipment provides additional equipment to handle and care for. Furthermore set-up of media output with a mixer (e.g. for performance) is time consuming, and additional equipment means additional controllers to regulate. Moreover, having an external physical mixer limits the types of features that such can explored in multimedia mixing. For example, traditional mixers may have a finite number of built-in audio and video effects for the treatment of media content.

Therefore, there is a need in the art for a system and method that improves the combining and mixing of media by offering a streamlined system for the creation, recordation, and distribution of multimedia content. This and other features and advantages of the present invention will be explained and will become obvious to one skilled in the art through the summary of the invention that follows.

SUMMARY OF THE INVENTION

Accordingly, it is an object of the present invention to provide a system and method that creates live multimedia mixing compositions which can then be shared by social media sites, specifically micro forums, for wider exposure of such creative output.

According to an embodiment of the present invention, a system for creating live multimedia mixing compositions comprising a process, a communications means, and dynamic media pairing module, which is comprised of computer-executable code stored in non-volatile memory, wherein the dynamic media pairing module is further comprised of at least a primary media player and a second media player, a cue and pass, a playlist, and a media screen, wherein each media player is configured to independently perform play mode operations of one or more media files without affecting play mode operations of another media file, wherein the play mode operations include queuing one or more media file for play within each media player, wherein the primary and secondary media players are configured to play the media files simultaneously, wherein a media file comprises content of text, audio, still images, photographs, animation, video or interactivity forms, wherein the media screen is configured to queue at least one media file while another media file is in play in said media screen, wherein the playlist displays media files to be selected and played in a primary or second media player, wherein the playlist displays media files to be selected and loaded into the cue and pass, wherein the cue and pass is configured to load and pass media into the media screen, the primary media player and the secondary media player and permit customization of audiovisual mixing parameters and further configured to communicate said audiovisual mixing parameters to the media screen, the primary media player and the secondary media player, wherein the dynamic media module, the processor, and the communications means are operably connected and are configured to request and receive a first and a second media file for selection, allow a user to individually customize audiovisual mixing parameters and play instructions of said media files within the cue and pass object, transfer via the cue and pass object the first media file with desired customization and play instructions to the primary media player and transfer the second media file with desired customization and play instructions to the second media player, generate an audiovisual playback of a combination of the customized first media file and the customized second media file through the dual play or mixing of said first media file and second media file, an allow a user to substitute the first or second media file with another media file during the audiovisual playback.

According to an embodiment of the present invention, the system for multimedia mixing wherein the media screen is able to queue at least two media files while at least one media file is in play.

According to an embodiment of the present invention, the system for multimedia mixing in which the media screen includes a touch interface and is adapted to detect various swipe gestures and perform the function of switching a media file currently in play with a media file from the playlist, said primary media player, said second media player, or said cue and pass to display.

According to an embodiment of the present invention, the media file is uploaded or already preloaded onto the dynamic media module.

According to an embodiment of the present invention, mixing parameters include tools for establishing cue points and setting image and audio panning in a forward, reverse, and scrubbing directions, and further for setting multiple image panning.

According to an embodiment of the present invention, the dynamic media module is further configured to permit customization of audiovisual mixing parameters in real time while said one or more media files are in play or pause mode.

According to an embodiment of the present invention, the dynamic media module is further comprised of additional media players such that an audiovisual playback may be generated by three or more media files in a play mode.

According to an embodiment of the present invention, the dynamic media module is further configured to record and save said audiovisual playback.

According to an embodiment of the present invention, the dynamic media module is further configured to generate a computer-readable hyperlink of said playback and send said hyperlink to a website or a mobile app for the sharing of media and communications, such as, but not limited to a web-based instant social network forum.

According to an embodiment of the present invention, the dynamic media module is further configured to repeat and replay said media file.

According to an embodiment of the present invention, a method for creating live multimedia mixing compositions is comprised of requesting and receive a first and a second media file for selection, allowing a user to individually customize audiovisual mixing parameters and play instructions of said media files within a cue and pass object, wherein the cue and pass object is configured to load and pass media onto the primary media player and the secondary media player and permit customization of audiovisual mixing parameters and further configured to communicate the audiovisual mixing parameters to the primary media player and the secondary media player, transferring via the cue and pass object the first media file with desired customization and play instructions to a primary media player and transfer the second media file with desired customization and play instructions to a second media player, generating an audiovisual playback of a combination of the customized first media file and the customized second media file through the dual play or mixing of the first media file and second media file on a media screen, allowing a user to substitute said first or second media file with another media during said audiovisual playback, in which each media player is configured to independently perform play mode operations of one or more media files without affecting play mode operations of another media file, wherein the play mode operations include queuing one or more media for play within each media player, wherein the primary and secondary media players are configured to play media files simultaneously, wherein a media file comprises content of text, audio, still images, photographs, animation, video or interactivity forms, wherein a media screen is configured to queue at least one media file while another media file is played in said media screen, wherein the second media file is configured to be executed as a background to the first media file, wherein the first media file or the second media file may be substituted by another media file in queue during the audiovisual playback, and wherein a playlist plays media files to be selected or loads selected media files into the cue and pass, the primary media player, the second media player, or the media screen.

According to an embodiment of the current invention, the method further comprises of queuing at least two media files at the media screen while at least one media file is in play.

According to an embodiment of the current invention, the method further comprises of switching a media file currently in display with a media file in said queue in order to display.

According to an embodiment of the current invention, the method further comprises of uploading a media file or loading a preloaded media.

According to an embodiment of the current invention, the method further comprises a media screen that includes a touch interface and is adapted to detect various swipe gestures and perform the function of switching a media file currently in display with a media file from said playlist, primary media player, second media player, or the cue and pass to display in said media screen.

According to an embodiment of the current invention, the media file is uploaded or already preloaded onto said dynamic media module.

According to an embodiment of the current invention, setting mixing parameters including tools for establishing cue points and setting image and audio panning in a forward, reverse, and scrubbing directions, and further for setting multiple image panning.

According to an embodiment of the current invention, permitting customization of audiovisual mixing parameters in real time while said one or more media files are in play or pause mode.

According to an embodiment of the current invention, the method further comprises of creating an audiovisual playback from three or more media files loaded in additional media players in a play mode.

According to an embodiment of the current invention, the method further comprises of recording and saving said audiovisual playback.

According to an embodiment of the current invention, the method further comprises of generating a computer-readable hyperlink of said playback and sending said hyperlink to a website or a mobile app, such as but not limited to a social network for the sharing of media and communications.

According to an embodiment of the current invention, the method further comprises of repeating and replay said media file.

According to an embodiment of the current invention, a system for creating live multimedia mixing compositions comprising a dynamic media pairing module, comprising a computer executable code stored in a non-volatile memory, a processor, and a communications means, wherein the dynamic media pairing module is further comprised of a at least a primary media player and a second media player, a mixer, a playlist, and a media screen; wherein each media is configured to independently perform play mode operations of one or more media files without affecting play mode operations of another said media file, wherein said play mode operations include queuing one or more media files for play within each media player and play on said media screen, wherein said primary and second media players are configured to play said media files simultaneously, wherein the media files comprise content of text, audio, still images, photographs, animation, video or interactivity forms, wherein the media screen is configured to queue at least one media file for play while another media file is in play; wherein the playlist displays media files to be selected and played in the media screen, or a primary or secondary media player, wherein the mixer is configured to contain controllers for the primary media player, the second media player, and is further configured to contain customization controls regulating the relative audiovisual parameters of each media file in each media player, wherein the dynamic media module, the processor, and the communications means are operably connected and are configured to request and receive a first and a second media file for selection, allow a user to individually customize the audiovisual mixing parameters, transfer the first or second media file to the media screen for display, generate an audiovisual playback of a combination of the first media file and the second media file through the dual play or mixing of the first media file and second media file, wherein the second media file is configured to be executed as a background to the first media file, wherein the second media file executed as a background may be converted to the foreground for display, thereby converting the first media file in play at the foreground to the background, wherein a media file for display in said media screen may be overlaid by an alternative media file such that the media file originally in display ceases to display and is transferred to a media screen queue, wherein the first media file or second media file may be substituted by another media file in queue during the audiovisual playback.

According to an embodiment of the current invention, the system further comprises an application programming interface (API), and a communication means, for the operation of said invention between websites or mobile apps with similar said APIs.

According to an embodiment of the current invention, the dynamic media pairing module is further configured to permit a system administrator to broadcast and regulate the output and input of the audiovisual playbacks to the general public.

According to an embodiment of the current invention, the dynamic media pairing module is further configured to open through a social billboard mode connected to a network of intercommunication display units.

According to an embodiment of the current invention, the dynamic media pairing module is configured to independently receive new media tagged to user generated comments and insert said new media into said playlist without interfering with one or more operation of said media players or display of said audiovisual playback.

According to an embodiment of the current invention, at least one administrator may set system access levels, prerequisites or requirements for at least one operator to use said system.

According to an embodiment of the current invention, at least one administrator may remove director control of system for an operator, and assume director control or pass control to another director with proper authentication.

DETAILED SPECIFICATION

The present invention generally relates to systems and methods for producing live audiovisual playbacks and multimedia mixes ("mashups" hereinafter) without a traditional mixer. Specifically, embodiments of the present invention are configured to provide users the ability to create, record, and share customized mashups.

Figure 1:
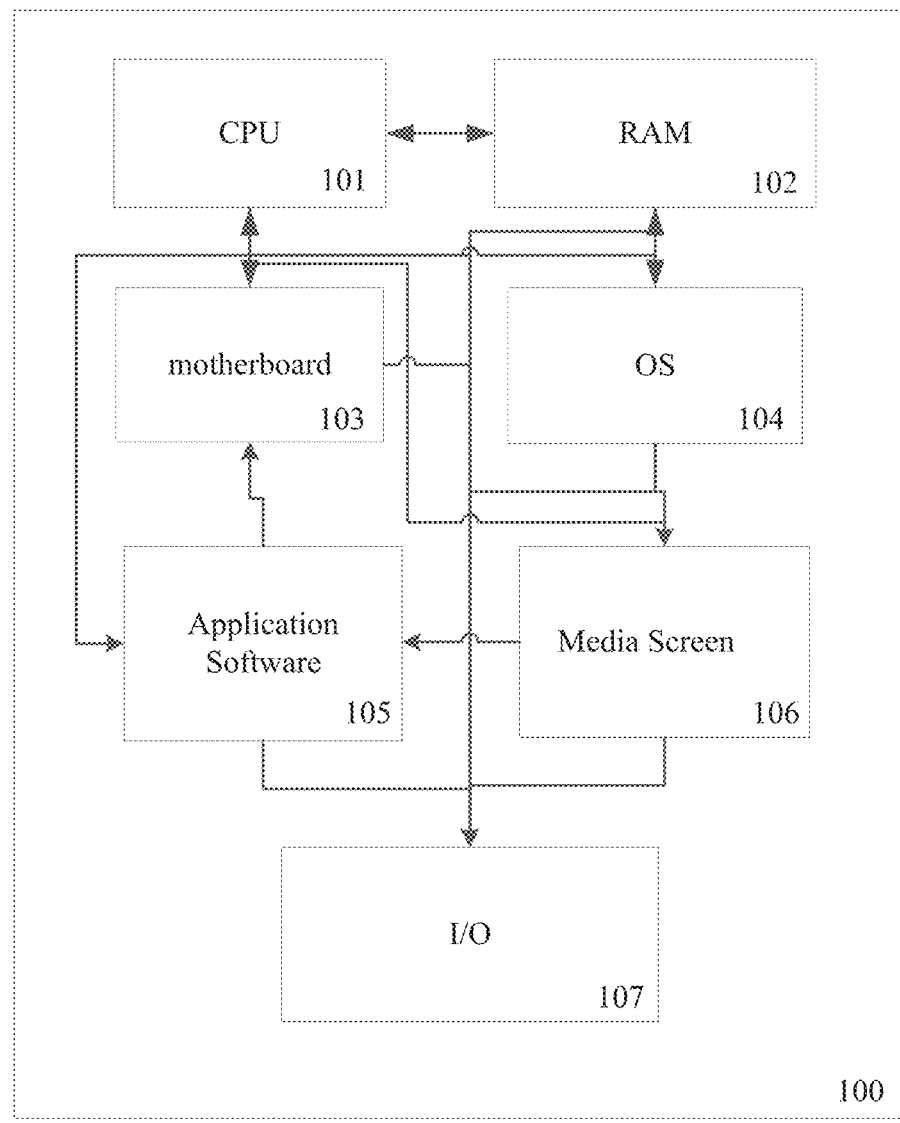
FIG. 1 illustrates a schematic overview of a computing device, in accordance with an embodiment of the present invention.

According to an embodiment of the present invention, the system and method is accomplished through the use of one or more computing devices. As shown in FIG. 1, one of ordinary skill in the art would appreciate that a computing device (100) appropriate for use with embodiments of the present application may generally be comprised of one or more of a Central processing Unit (CPU) (101), Random Access Memory (RAM) (102), a storage medium (e.g., hard disk drive, solid state drive, flash memory, cloud storage) and a motherboard (103), an operating system (OS) (104), one or more application software written in one or more programming languages (105), one or more media screens (106) and one or more input/output devices/means (107). Examples of computing devices usable with embodiments of the present invention include, but are not limited to, personal computers, smartphones, laptops, mobile computing devices, tablet PCs, smart TVs, smartglasses (such as Google Glass), or virtual reality glasses (such as Microsoft's HoloLenz or Oculus Rift), and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In a preferred embodiment of the present invention, the computing devices utilized will incorporate one or more input means and output means for use and interaction with the system. Input means may include, but are not limited to, touchscreen interfaces, keyboard interfaces, accelerometers, gyroscope, motion sensors, buttons, cameras, microphones and 3D imaging devices, or any combination thereof. Output means may include, but are not limited to, video displays elements, audio output devices (e.g., speakers, headphones), haptic output means (e.g., force feedback devices) or any combination thereof. One of ordinary skill in the art would appreciate that there are numerous input means and output means that could be utilized with embodiments of the present invention, and embodiments of the present invention are contemplated for use with any such input means and output means.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
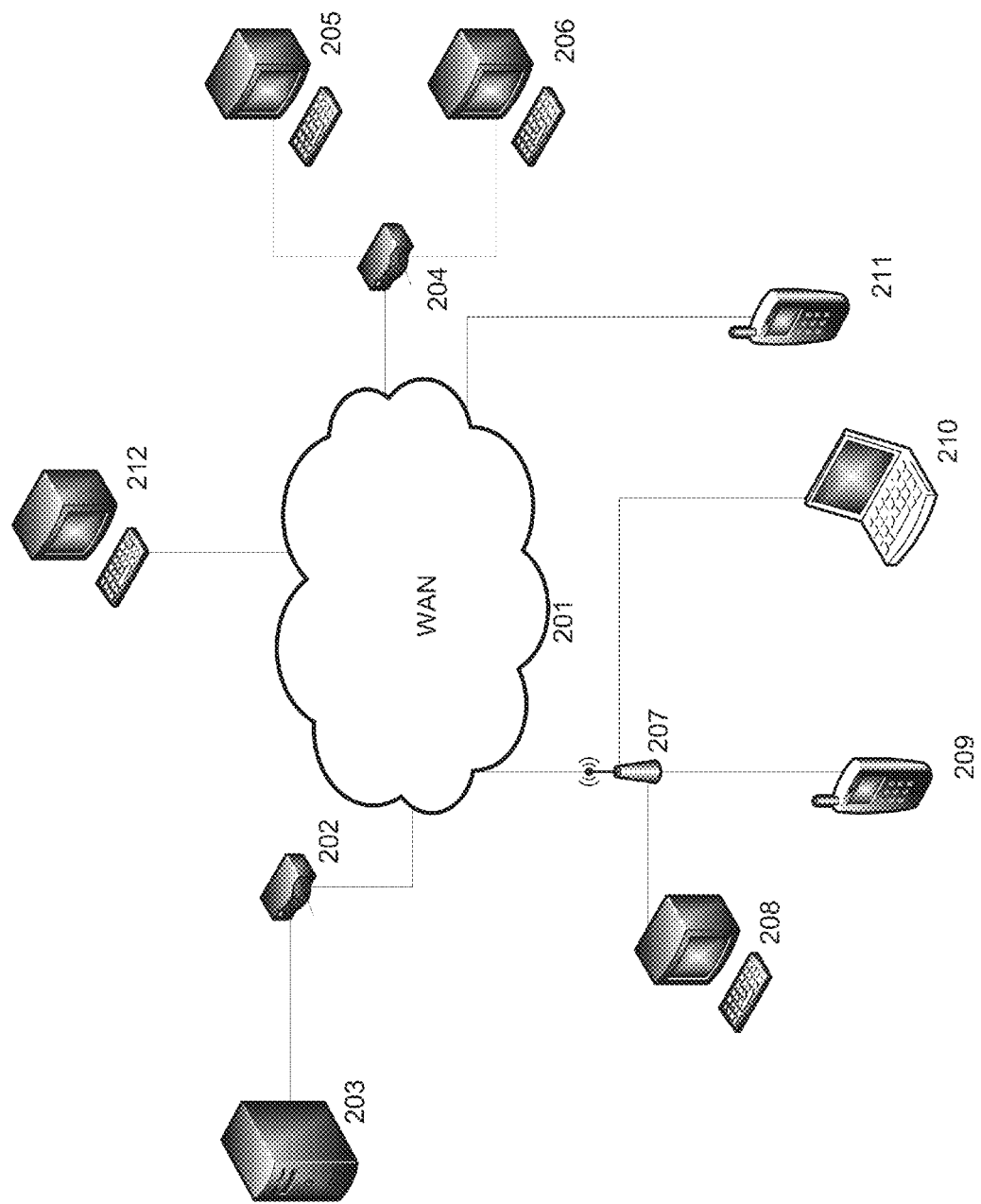
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers (203) for electronically storing information used by the system. Applications in the application server (203) may retrieve and manipulate information in storage devices and exchange information through a Network (201) (e.g., the Internet, a LAN, WiFi, Bluetooth, etc.). Applications in server (203) may also be used to manipulate information stored remotely and process and analyze data stored remotely across a Network (201) (e.g., the Internet, a LAN, WiFi, Bluetooth, etc.).

According to an exemplary embodiment, as shown in FIG. 2, exchange of information through the Network (201) may occur through one or more high speed connections. In some cases, high speed connections may be over-the-air (OTA), passed through networked systems, directly connected to one or more Networks (201) or directed through one or more routers (202). Router(s) (202) are completely optional and other embodiments in accordance with the present invention may or may not utilize one or more routers (202). One of ordinary skill in the art would appreciate that there are numerous ways server (203) may connect to Network (201) for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server (203) via Network (201) or other network in numerous ways. For instance, a component may connect to the system i) through a computing device (212) directly connected to the Network (201), ii) through a computing device (205), (206) connected to the WAN (201) through a routing device (204), iii) through a computing device (208), (209), (210) connected to a wireless access point (207) or iv) through a computing device (211) via a wireless connection (e.g., CDMA, GMS, 3G, 4G) to the Network (201). One of ordinary skill in the art would appreciate that there are numerous ways that a component may connect to server (203) via Network (201), and embodiments of the present invention are contemplated for use with any method for connecting to server (203) via Network (201). Furthermore, server (203) could be comprised of a personal computing device, such as a smartphone, acting as a host for other computing devices to connect to.

The present invention generally relates to the ability to produce live multimedia mixes and audiovisual playbacks (mashups) without a traditional mixer. In particular, embodiments of the present invention are configured to provide users the ability to create, record, and share customized mashups. For purposes of this application multimedia may include, but is not limited to, one or more of, and or combination of: text, audio, still images, animation, video, or interactivity content forms. One of ordinary skill in the art would appreciate that there are numerous types of multimedia that could be utilized with embodiments of the present invention, and embodiments of the present invention are contemplated for use with any type of multimedia.

For purposes of this application the terms multimedia or media, multimedia or media file and multimedia or media object shall be regarded as equivalent terms and may be used interchangeably. Further, for the purposes of this application, the title "Dynamic Multimedia Pairing" is generally descriptive of the dynamic relationship between multimedia files and two media players; however, for purposes of this application the term 'pairing' should not be considered limiting or restrictive. Additional multimedia players and or tools may be used, some of which will be described upon further review of this application.

In a preferred embodiment of the present invention, the system is comprised of one or more servers configured to manage the transmission and receipt of content and data between users and recipients. The users and recipients may be able to communicate with the components of the system via one or more mobile computing devices or other computing device connected to the system via a communication method supplied by a communication means (e.g., Bluetooth, WIFI, CDMA, GSM, LTE, HSPA+). The computing devices of the users and recipients may be further comprised of an application or other software code configured to direct the computing device to take actions that assist in the playing and recording of mashups, which can be saved and distributed to others.

According to an embodiment of the present invention, the system is configured to produce live audiovisual playback or multimedia mixes. A Dynamic Media Pairing (DMP) module comprises computer executable instructions stored in memory and capable of being run by a processor of a computing device. The DMP module further includes a Primary Media Player (PMP) object, a Second Media Player (2MP) object, a Cue and Pass (C&P) object, a media screen, and a playlist of selectable multimedia files. In an exemplary embodiment shown in FIG. 5, the PMP object (501) (shown in the form of a status bar) opens and/or plays multimedia files in the media screen (505). The 2MP object (502) is shown in the form of a status bar (outlined in a certain color) which may be used to control another multimedia file playing in the background. The C&P object (503) is configured to pass media objects into the PMP (501) or 2MP (502), per a user's preference, and sets mixing parameters for two or more multimedia objects. Mixing parameters may include setting pans, balance, and cue points. One of ordinary skill would appreciate that there are numerous other mixing parameters that may be applied in mixing multimedia. Once the mixing parameters are set, the C&P (503) provides the mixing parameters to the PMP (501) and 2MP (502). The C&P object (503) is shown as a status bar (outlined in a different color than the 2MP). One of ordinary skill in the art will appreciate that the PMP, 2MP, and C&P objects may assume other suitable graphical forms besides those shown in FIG. 5.

Figure 5:
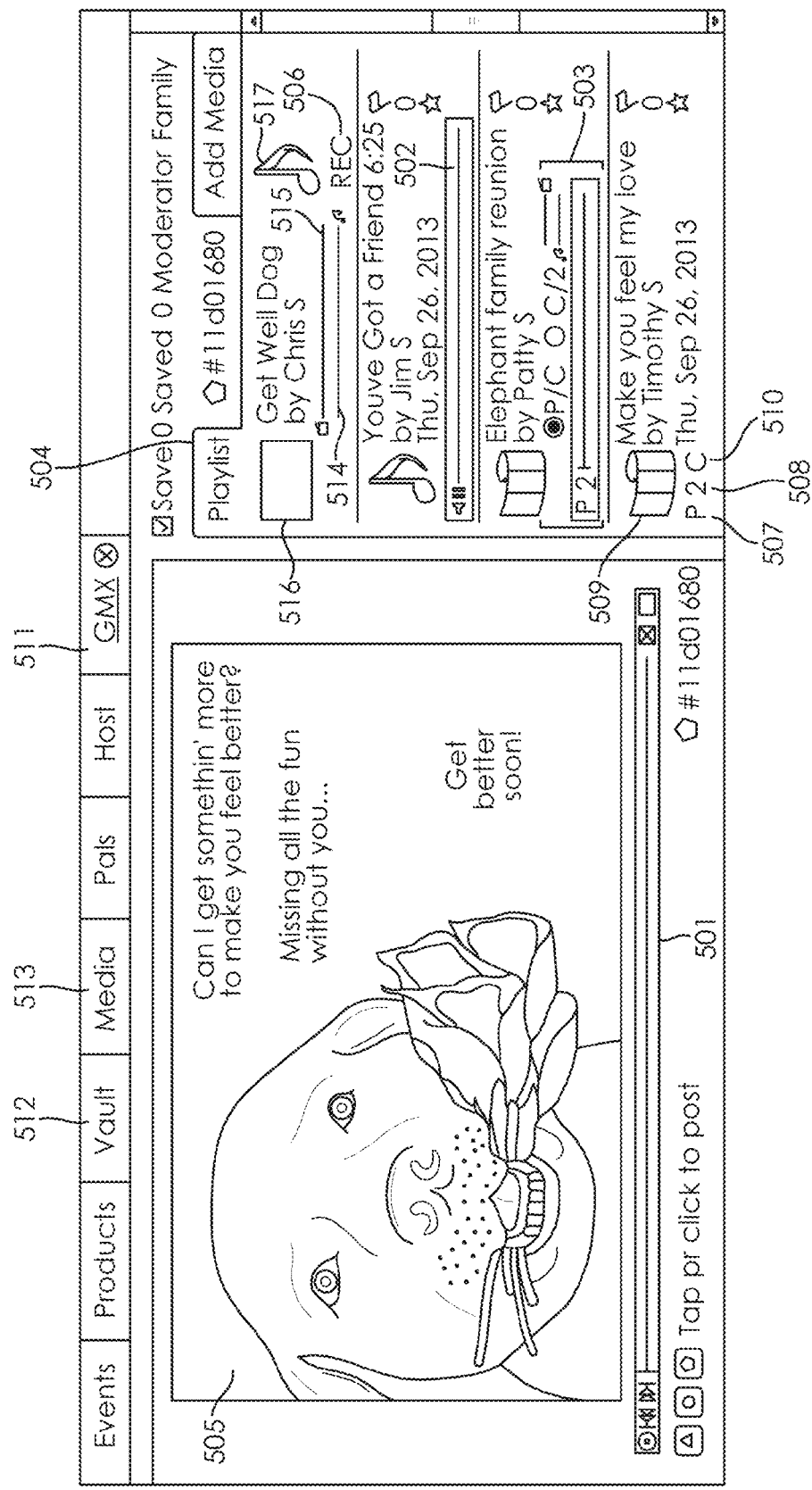
FIG. 5 is an image depicting a screen shot of a web page showing an exemplary embodiment of the present invention.

The DMP module further comprises a button object configured to open and run a multimedia file in the PMP. In a preferred embodiment, the button object is in the form of a "P" button (507). "P" button objects are preferably positioned below the multimedia file thumbnails (509), and on the left side of the C&P status bar, as shown in FIG. 5. A user is able to click on the "P" button (507) to pass a selected multimedia file to the PMP object (501) where it is opened and/or played. Another button object is configured to open a multimedia file, preferably an audio and/or video file, in a 2MP object (502) to be played as background to the multimedia file running in the PMP (501). This button object is in the form of a "2" button (508). The "2" buttons are preferably positioned under the multimedia file thumbnails (509), and adjacent to the "P" button on the C&P status bar as shown in FIG. 5. One of ordinary skill will appreciate that these button objects may assume any suitable form and are not limited to a "P" or "2" button. Multiple 2MP objects may be opened by a user, each running a different multimedia file in the background while multiple multimedia files are played in the PMP. One of ordinary skill will appreciate that multiple C&P objects (503) may be opened by a user, each with a different multimedia object, user defined presets, and user defined cueing order, so that a media set-list and play order can be created.

Figure 6:
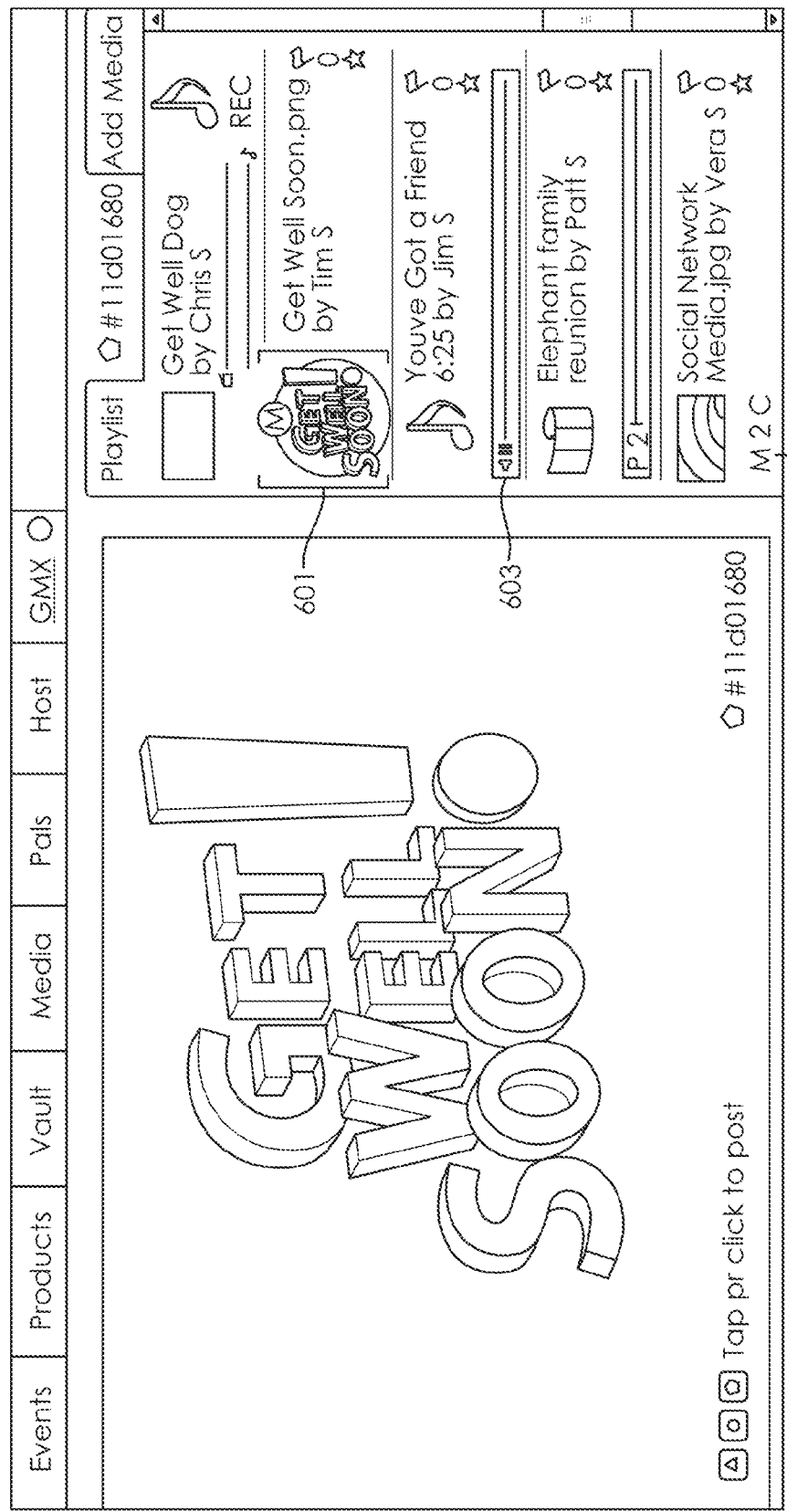
FIG. 6 is an image depicting a screen shot of a web page showing an exemplary embodiment of the present invention.
Figure 7:
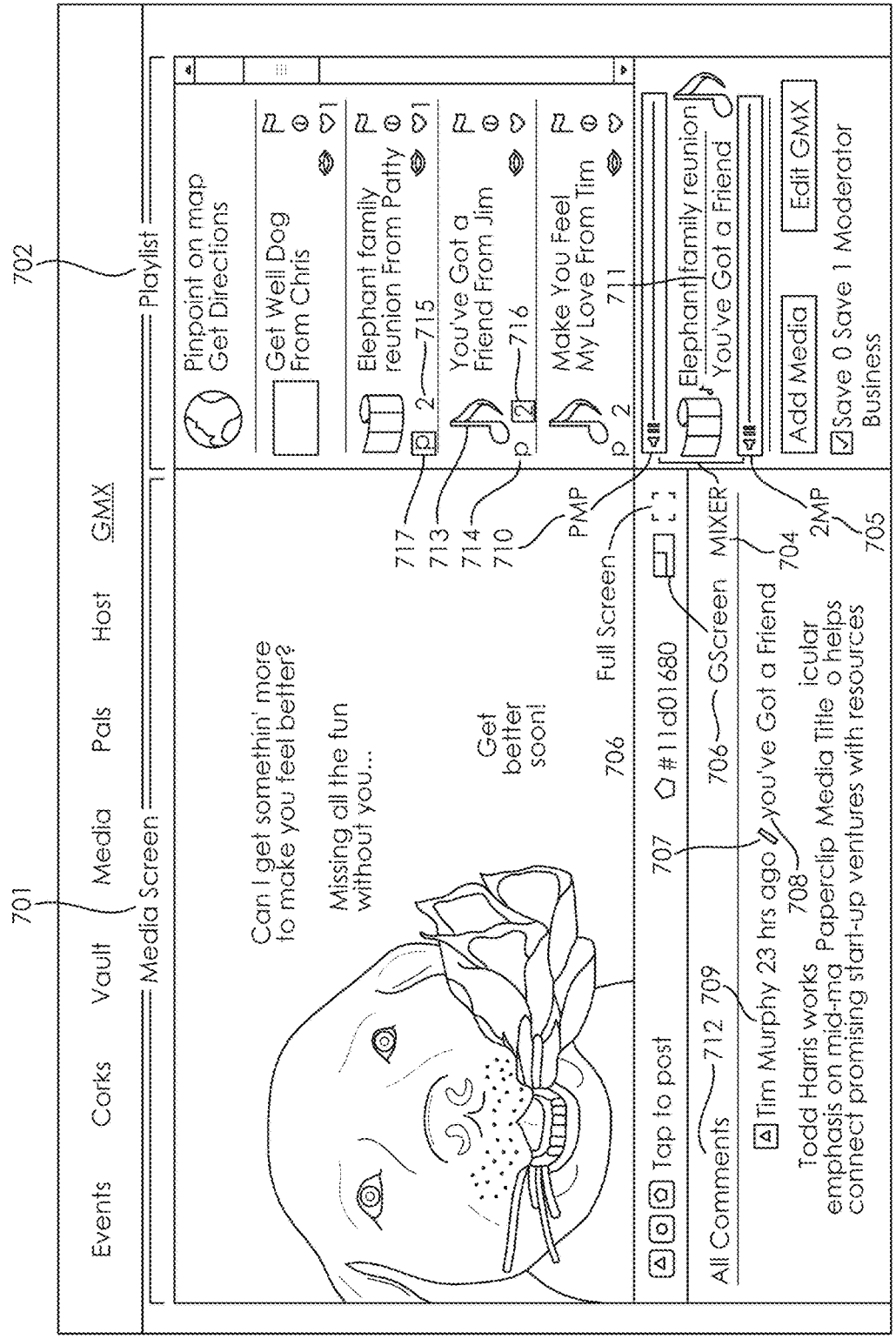
FIG. 7 is an image depicting a screen shot of a web page showing an exemplary embodiment of the present invention.

According to an embodiment of the present invention, the PMP (501) opens and/or plays multimedia files such as images, audio, video, or any combination thereof in the media screen (505). When a multimedia file is opened and/or playing in the PMP (501), a thumbnail (516) of the file is displayed to the left of the media file title in the playlist (504) as shown in FIG. 5. If a 2MP (502) is open, a thumbnail (517) of the file playing in the 2MP is also displayed to the right of the PMP file's title. One of ordinary skill will appreciate that the thumbnails (509, 516 and 517) may be displayed in different positions and are not limited to the positions described herein. In addition, the system may provide an Audio Pan (AP) (514) regulator and/or an Image Pan (IP) (515) regulator for manipulating one or more multimedia objects. A record button (506) is also provided to record a dynamic media pairing session in which one or more multimedia objects in the PMP is mixed with one or more multimedia objects being played by the 2MP and mixed with one or more optional pan tools such as a Multiple Image Pan (MIP) (601) or the like. In a preferred embodiment the record button (506) is displayed as an REC icon as shown in FIGS. 5 and 6. However, one of ordinary skill will recognize that any suitable icon may be used for a record button.

According to an embodiment of the present invention, the 2MP (502) is a miniature audio and video player located in the playlist, in proximity to the multimedia file being played by the 2MP.

The term "display" or "play" or their respective conjugations are deemed equivalent and defined as any open media or multimedia file in the PMP and or 2MP and could also refer to a file that is paused, or being panned backward or forward, or the display of a still image such as a .JPG file, or the sound of an audio file such as a .MP3 file, or the sound and display of an audiovisual file such as a .WMV or .MOV file. The term "media file" or "multimedia file" are deemed equivalent and can refer to a computer or digital file consisting of one or multiple media of expression or communication.

According to an embodiment of the present invention, the C&P (503) is used to load media, set pans, balance, and cue point. C&P media and programmed presets, such as mixing parameters and play instructions, are passed to either the PMP (501) or the 2MP (502). One of ordinary skill will appreciate that programmed presets may include many different types of instructions for how to play or display a multimedia object in either the PMP or 2MP. The C&P object (503) is displayed in the playlist (504), in proximity to the selected multimedia file (i.e. the multimedia file to which the presets apply and which is selected for loading in the PMP or the 2MP).

According to an embodiment of the present invention, the DMP initializes with a PMP (501) and a playlist (504). The playlist may load with some media preloaded. Once the system is initialized, additional media files may be added to the playlist. In an exemplary embodiment a user can select a media file to be opened and/or played in the PMP by clicking/selecting a thumbnail (509) or title in the playlist. Furthermore, the DMP system may initialize with a 2MP (502). Furthermore, the DMP system may initialize with user or system selected media files to play in the PMP and/or the 2MP. In a preferred embodiment, the media files include button objects displayed therein. One of said button objects labeled "2" (508) launches a new 2MP upon being selected or clicked. Another button object labeled "C" (510) launches the C&P (503). However, one of ordinary skill in the art will recognize that other suitable icons or labels may be used for said button objects.

According to an embodiment of the present invention, the system is configured to allow a user to play an audio or video file in either the PMP or the 2MP with one click of a designated button. In a preferred embodiment, the button is a "play" button. However, selecting or clicking a thumbnail or title of a media file in the playlist may also open and/or play the selected media file. Alternatively, selecting the thumbnail or title of a media file in the playlist may pass that file to the PMP or 2MP, and the user clicks/selects a button, such as a play button, to open and/or play the file. If the thumbnail or title of a media file is selected, the image pan (IP) regulator is set to 100% PMP, the image is fully displayed and centered in the media screen), and the audio pan (AP) regulator is set to 100% 2MP (i.e. 100% of the audio is played in 2MP). Furthermore, 2MP play mode is not affected when an image file is selected. For example, the 2MP continues to play a media file if play is in progress while the image is opened and displayed in the media screen. Similarly, C&P settings (i.e. presets or other programmed instructions) are not affected. If an audio or video file thumbnail is selected from the playlist, the 2MP is set to 'pause' mode (i.e. a media file playing in 2MP is paused); the AP regulator is set to 100% PMP (i.e. 100% of the audio is played in the PMP); the IP regulator is set to 100% PMP (i.e. the image is fully displayed and centered in the media screen); the C&P settings are not affected and the audio or video immediately plays. This simplifies multiple adjustments into a simple one tap selection.

According to an embodiment of the present invention, media files and the C&P includes a button object in the form of a "P" button (507) as shown in FIG. 5. The "P" button is used to pass media to the PMP, while preserving the 2MP play mode status. For example, if a media file is playing in 2MP it will continue to play when a user selects the "P" button thereby passing a media file to the PMP. One of ordinary skill in the art will appreciate that any suitable icon may be used instead of a "P". Furthermore, different types of "P" button objects may be utilized in the system. In one exemplary embodiment, a "P" button object (first type) may be displayed in proximity to an associated media file in the playlist, and another "P" button (second type) may be displayed on a C&P object. Selecting the first type of "P" button does not affect the AP and IP settings. Furthermore, hovering a selection tool, such as a mouse cursor, over the first type of "P" button displays the text "Pass to Media Screen, Keep Current Settings." Selecting the second type of "P" button displayed in the C&P resets AP and IP to C&P settings (i.e. the AP and IP settings selected by a user in the C&P). Hovering a selection tool over the second type of "P" button displays the text "Pass to Media Screen, Use These Settings." One of ordinary skill will appreciate that any other useful information, or no information, may be displayed for a user when hovering over either type of "P" button. Furthermore, other types of "P" button objects, or other buttons generally, may be utilized in the system.

In a preferred embodiment of the invention, there are different types of "2" buttons. One type of "2" button is associated with a selected media file in a file location. Selecting this first type of "2" button opens an audio or video file in a new 2MP. If an old 2MP is open, it is closed. Selecting the "2" button object for a selected media file plays the audio portion of the file as a background to the media file in the PMP. The PMP play mode is not affected when the "2" button is selected. For example, if a media file is playing in the PMP it will continue to play, or if paused it will remain paused. The IP will be set to 100% PMP which is the default setting. The AP will be set to 100% 2MP, the default setting, which means that audio for the selected media file will play only in the 2MP (i.e. the audio will not be divided between 2MP and PMP). Furthermore, existing C&P settings are preserved.

In the preferred embodiment, when the first type of "2" button is selected, the DMP file buttons temporarily disappear and a new 2MP opens displaying a pause button in the 2MP status bar while the selected media plays. Hovering a selection tool such as a mouse cursor over the "2" button displays the text: "Play Background Now". However, one of ordinary skill will appreciate that any other useful text, or no text, may be displayed when the selector tool hovers over this type of "2" button.

A second type of "2" button is displayed in the C&P object. Selecting this type of "2" button closes the C&P object and opens a new 2MP object. In other words, the new 2MP replaces the C&P object. The C&P cue point setting is transferred to the new 2MP and any existing PMP and 2MP play state is not affected (e.g. the PMP media file being played at the time the "2" button is selected will continue to play and the previous 2MP play/pause state is applied to the new 2MP). In addition, the C&P IP and AP settings are transferred to the new pairing of PMP and 2MP media. If a selector tool such as a mouse cursor hovers over this type of "2" button it will display the text: "Launch Second Media Player with these Settings". However, one of ordinary skill will appreciate that any other useful text, or no text, may be displayed, when the selector tool hovers over this type of "2" button.

In a preferred embodiment of the invention, selecting the C button opens a new C&P object. If an old C&P object is open, it is closed along with its associated button objects. The new C&P object includes a new set of standard DMP buttons (i.e. "P" and "2"). If a user hovers a selector tool such as a mouse cursor over the C button, the following text is displayed: "Cue and play after current background ends". However, one of ordinary skill will recognize that any useful information, or no information, may be displayed when the selector tool hovers over the C button. The C&P object preloads the next media file in the playlist before it passes it to the PMP or 2MP for playing, thus reducing PMP and 2MP start delays and stutter (i.e. pausing while loading). Furthermore, the system fetches only files preselected from the playlist, making it more efficient than loading a complete playlist or a list arrived through automated reasoning or predictive analytics. Preselection of a media file from the playlist may be in the form checking a check box next to a selected file, highlighting a selected file, or dragging a title or thumbnail of a selected file into a designated field. Any other appropriate selection method known in the art may also be employed.

According to a preferred embodiment of the invention, the default C&P settings are: cue point=start of track; AP=100% 2MP; and IP=100% PMP. However, one of ordinary skill in the art will appreciate that other default settings may be used, such that the AP and IP may be any percentage from 0% to 100% and the cue point may be any point along a media track. The C&P settings such as pans and cue point can be adjusted by the user to generate new settings (i.e. a preset). These settings are applied to the media object and or PMP/2MP pairing when it is passed to the 2MP or PMP.

In a preferred embodiment of the invention, the C&P passes media to either the PMP or the 2MP in 4 ways. (1) When the 2MP media track ends it is closed. The C&P object then transforms into a new 2MP object. C&P settings are transferred to the new 2MP/PMP pairing and the new 2MP media file plays immediately. (2) A user selects the "2" button from the C&P object. This closes any previous 2MP that is open and passes the currently loaded media file to a new 2MP. The C&P object closes and the new 2MP object appears, so that the C&P object appears to transform into the new 2MP object. The C&P presets are applied to the media file in the new 2MP object and or PMP/2MP pairing. Previous 2MP play/pause state is transferred to new 2MP object. If there is no previous 2MP open, the file in the new 2MP object plays immediately. If no play/pause state is established in previous 2MP (due to still image or non-moving media loaded in 2MP), the file in the new 2MP object plays immediately. (3) Selecting the "P" button from the C&P object will pass the currently loaded media file to the PMP. In addition, the C&P presets are transferred to the PMP and 2MP. The 2MP play state is preserved. For example, any media file currently playing in the 2MP continues to play normally, or if paused continues to be paused. Selecting the "P" button also closes the C&P object. (4) Selecting a thumbnail or title of a media file from the C&P object pauses media file in the 2MP, plays C&P media in the PMP, and closes the C&P object. Both AP and IP are set to 100% PMP.

According to an embodiment of the present invention, the C&P object can be used to set a cue point. The cue point is where the track is set to start when the C&P passes a media file to either the PMP or 2MP. In a preferred embodiment, the cue time is displayed right of a status bar and left of a media file duration indicator. For example, 0:33/7:55 would indicate a cue point starting at 33 seconds in a media file having a 7:55 minutes duration time. One of ordinary skill in the art will appreciate that the cue time can be displayed in any suitable manner.

The C&P object also includes 'Preview' and 'Scrubbing" features which can be used to locate a cue point. During this process, the user is able to rewind/forward media while hearing and viewing it in the C&P thumbnail. C&P audio is isolated from the 'House' mix (i.e. PMP and 2MP pairing). In an exemplary embodiment, the user can preview a media file using the C&P object by selecting and holding a point to the right or left of the cue point. If the 'hold' point is to the right of the 'cue' point, the track plays. If the 'hold' point is to the left of the 'cue' point, the track plays in reverse. Dragging the 'hold' point to the side opposite the 'cue' point changes direction the track is played (forward or reverse). Releasing the 'hold' stops the track from being played and sets the 'cue' at that spot. The Scrubbing feature is used by dragging a cue marker along the status bar while listening to audio and viewing video in the thumbnail. To set a cue point, the user drops the cue marker (i.e. unclicks it or lets it go) or selects (click or tap) a point along the status bar.

In an exemplary embodiment, two methods are used to isolate the C&P volume from the 'House' mix (i.e. the PMP and 2MP pairing). The first method employs use of two stereo audio channels. The House mix (PMP and 2MP mixed sound) is assigned to stereo channel 1, while the C&P sound is assigned to stereo channel 2. In this method, C&P stereo channel 2 is never transferred to PMP and 2MP, thus preserving separation of House and Cue mix. In the second method, the DMP system uses standard stereo media player left/right balance controls. These controls can be used to separate the 'House' (what the audience hears) from the C&P (what the operator hears) audio. More specifically, a user can adjust the PMP and 2MP balance 100% 'Left' (stereo sum mono) for the House mix, and adjust the C&P balance 100% 'Right' (stereo sum mono) for the scrub mix. In this method, the C&P balance settings are not transferred to the PMP and 2MP, thus preserving House and C&P sound isolation.

According to an embodiment of the present invention, an Audio Pan (AP) regulator is used to inversely adjust the PMP volume proportional to the 2MP. In a preferred embodiment, an AP slider button in the shape of a music note is located in proximity to the file associated with the PMP. A user slides the slider button along a slider bar to adjust the audio pan. The left extreme of the AP slider bar indicates 100% PMP, and 0% 2MP. The right extreme of the AP slider bar indicates 0% PMP, and 100% 2MP (default setting). Sliding the AP slider button right or left inversely and proportionally increases or decreases PMP and 2MP volumes. A second type of AP regulator is displayed in the C&P object. It is used to pre-set the audio pan between the PMP and the C&P files. A third type of AP regulator in the C&P object is used to pre-set the audio pan between the C&P file and the 2MP. Pan radio buttons P/C and C/2 are provided in the C&P object. They are used to switch between the second and third type of AP regulators. Selecting the P/C radio button makes the second type of AP regulator adjustable. Selecting C/2 radio button makes the third type AP regulator adjustable. FIG. 5 shows the pan radio button P/C selected (C/2 is not selected). Again, this indicates the second type of AP regulator is adjustable. This AP regulator is in the form of bar and a slider button in the shape of a music note. However, one of ordinary skill in the art will appreciate that there are many other suitable graphical forms besides what is shown for setting one or more AP regulator pre-sets.

According to an embodiment of the present invention, the Image Pan (IP) regulator is used to transition from the PMP file to the 2MP file. This transition can take several forms (e.g. fades, sliding or flipping of images etc.) In a certain embodiment, the IP regulator comprises an IP slider button and slider bar. The IP regulator is located in proximity to the media file in the PMP. Sliding the IP regulator button left or right on the slider bar causes the media screen to transition from the PMP to the 2MP image. At the halfway point the media screen may display equal portions of both PMP and 2MP images. At the extreme left position, the media screen displays only the PMP image file (default setting). At the right extreme, the media screen displays only the 2MP image file. A second type of IP regulator is provided in the C&P object. It is used to pre-set the image pan between the PMP and the C&P files. A third type of IP regulator in the C&P object is used to pre-set the image pan between the C&P and the 2MP files. Pan radio buttons P/C and C/2 are provided in the C&P object. They are used to switch between the second and third type of IP regulators. Selecting the P/C radio button makes the second type of IP regulator adjustable. Selecting C/2 radio button makes the third type IP regulator adjustable. FIG. 5 illustrates the second type of IP regulator in the form of a slider button and bar. The pan radio button P/C is selected (C/2 is not selected) indicating the second type of IP regulator is adjustable. However, one of ordinary skill in the art will appreciate that there are many other suitable graphical forms besides what is shown for setting one or more IP regulator pre-sets.

In a preferred embodiment, there are three DMP buttons used for still images. They are the 2 and C buttons discussed previously, and an "M" button. When a 2MP is open, the "M" button is displayed on each image file. The "M" button opens a multiple image pan (MIP) tool (601) in the associated file. Furthermore, if a selector tool hovers over the 'M' button (602), the following text is displayed: "Open Multi Image Pan and Scroll the Circle". A new MIP is opened by selecting/clicking on the 'M' button. When a new MIP is opened, a circle with an "M" icon at the 12 o'clock position appears around the thumbnail associated with the image file. The user can then drag the "M" icon around the circle to transition between 3 images sourced from MIP, 2MP, and PMP files. These image transitions appear in the media screen. The 12 o'clock position represents the MIP still image default view. The 4 o'clock position represents the 2MP image, and the 8 o'clock position represents the PMP image. However, one of ordinary skill in the art will appreciate that other views may be displayed at these positions, or that different views may be arbitrarily assigned to different positions along the circle, or that more than 3 images may be arbitrarily assigned to different positions along the circle, or that dragging the 'M' icon toward the center of the circle could display more than 2 images simultaneously or a composite of more than 2 images. Selecting the MIP 'title' passes the MIP file to the PMP and closes the MIP tool.

Exemplary Embodiment

Figure 3:
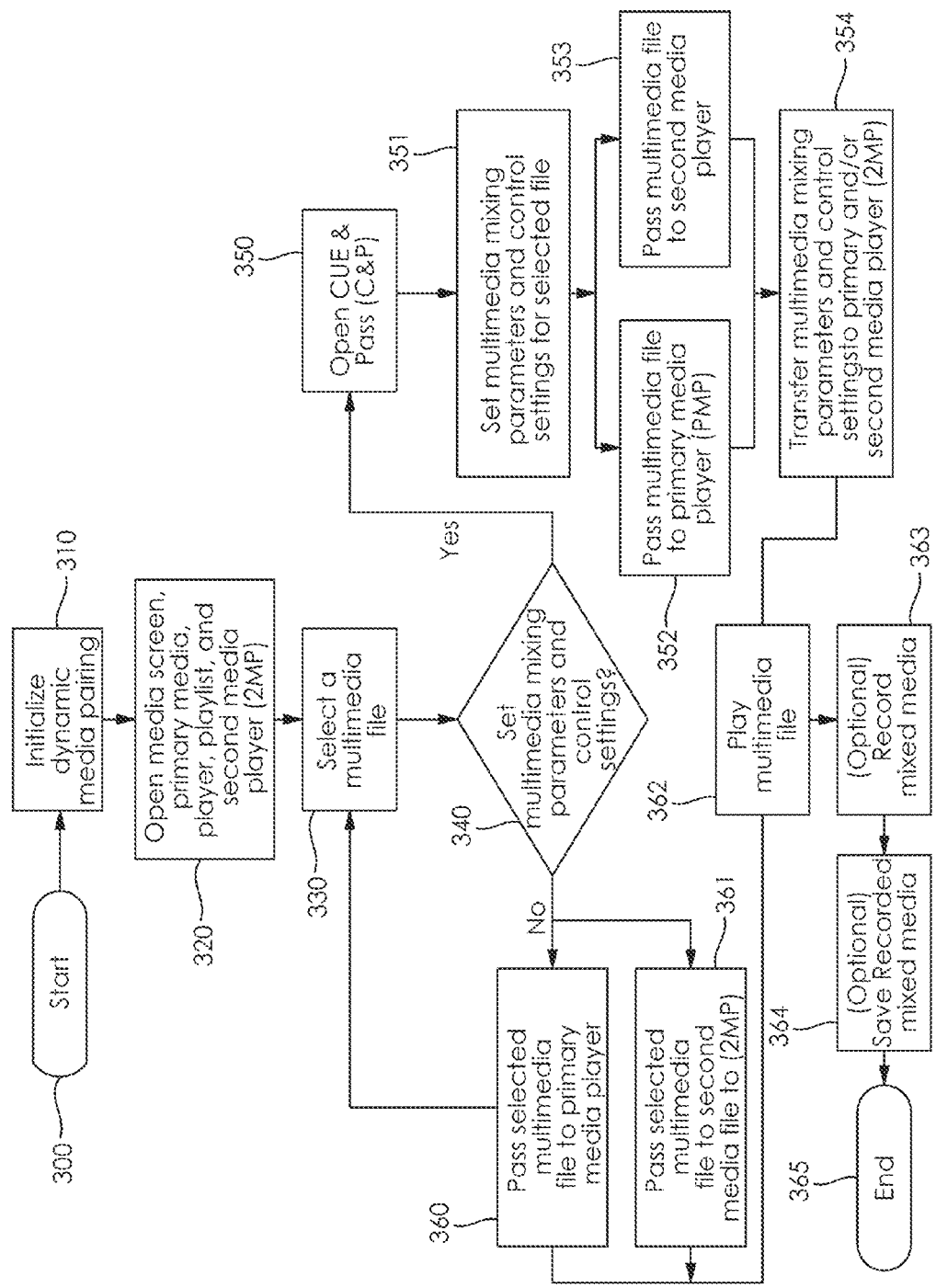
FIG. 3 is an illustration of an exemplary process flow, in accordance with an embodiment of the present invention.

Turning now to FIG. 3, an exemplary method is shown, in accordance with an alternative embodiment of the present invention. The process starts at step 300 with a user wishing to initiate a Dynamic Media Pairing session in order to create a mixed media mashup. At step 310, the Dynamic Media Pairing module is initialized, and at step 320, the media screen, the PMP, the playlist and the 2MP are opened for operation of the claimed invention. Exemplary embodiments of these objects are shown in FIGS. 5 and 6.

At step 330, a multimedia file is selected from the playlist. A user then has the option at step 340 of setting multimedia mixing parameters and control settings for the selected multimedia file. If a user chooses not to set multimedia mixing parameters and control settings, the user may pass the multimedia file to the PMP at step 360. This may be accomplished by selecting the "P" button as discussed earlier, or clicking on the title or thumbnail associated with the file. Alternatively, a user may pass a selected multimedia file to a 2MP at step 361. At step 362 the multimedia can be played. If there are multimedia files being played in the PMP and one or more 2MPs, the mixing of these multimedia files can be recorded as a mashup of different multimedia files at step 363 and saved to a file at step 364. A user can then either end the Dynamic Media Pairing session at 365, or repeat one or more of the previously described steps as desired.

If a user wishes to set multimedia mixing parameters and control settings, the user can open a C&P object at step 350. In an exemplary embodiment, a user can select the 'C' button to open a new C&P object which is used to set mixing parameters and control settings in step 351, such as cue points and adjusting the AP and IP sliders (i.e. slider bar and button). The AP and IP sliders adjust the image pan and audio pan between the PMP and C&P or between 2MP and C&P files as previously discussed. The selected multimedia file can then be passed to a PMP at step 352 or a 2MP at step 353. The mixing parameters and control settings are also passed to the PMP and/or 2MP at step 354. The multimedia file can then be played in step 362 along with one or more other multimedia files passed to one or more 2MPs. In other words step 353 can be repeated such that one or more 2MPs are opened with a multimedia file in each 2MP.

At this point, the PMP and/or 2MPs can play their respective multimedia files at step 362 in accordance with the mixing parameters and control settings provided by the C&P at step 354. At step 362 the operator can further adjust PMP and 2MP settings on the fly (in real-time) while the media plays or pauses in their respective media players (PMP and/or 2MP). At step 363, a user can optionally record the mixed media produced and save it to a file at step 364. The user can then either end the Dynamic Media Pairing session (365) or repeat one or more of the previously mentioned steps.

A Further Embodiment

Figure 4:
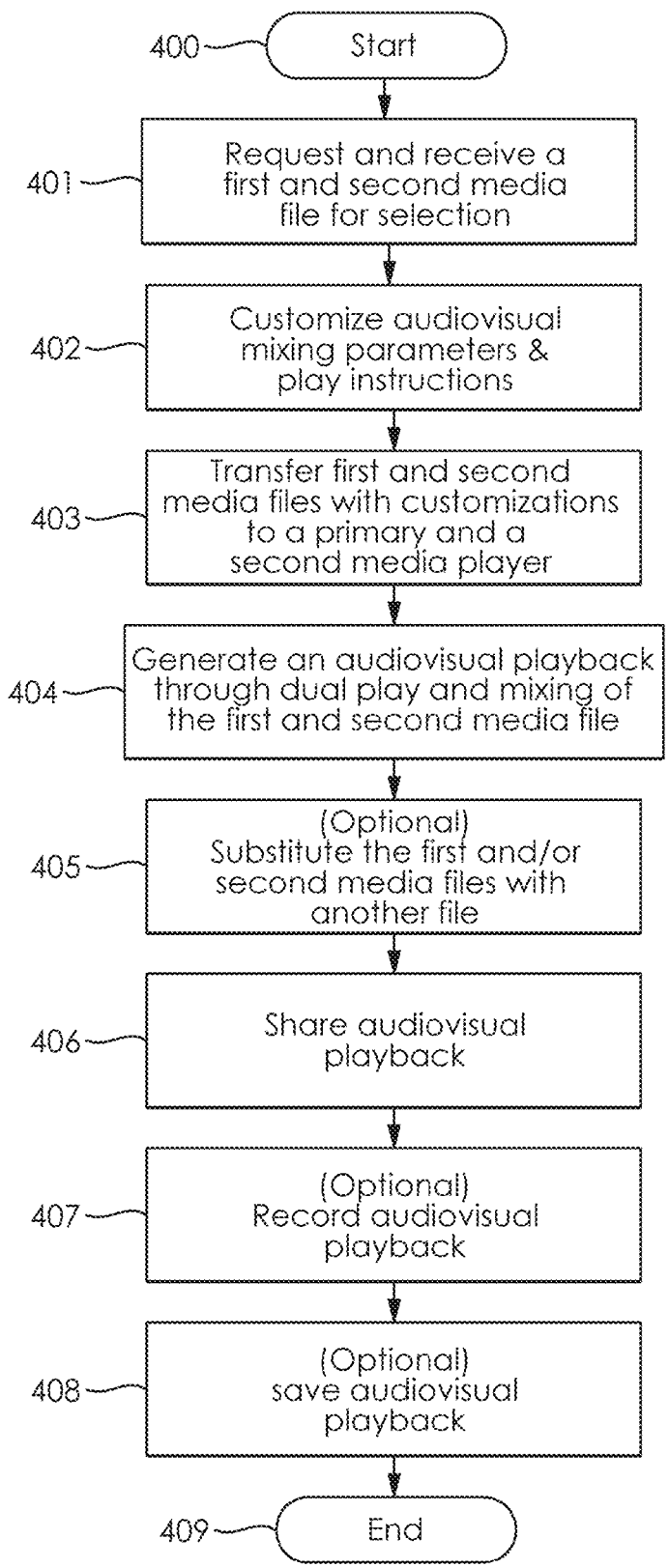
FIG. 4 is an exemplary process flow, in accordance with an embodiment of the present invention.

Turning now to FIG. 4, another method is shown, in accordance with an embodiment of the present invention. For the sake of simplicity, only one media file per media player is disclosed. However, the number of media files and media players disclosed shall not be a limited feature of the claimed invention. The process starts at step 400 with a user requesting and receiving a first media file by the PMP and a second media file by the 2MP at step 401. These media files can be selected from the playlist.

If the user desires, each of the media files can be customized at step 402, followed by transferring the customized file to one of the media players at step 403. Customization involves adjusting the image pan (IP) or audio pan (AP) depending on the type of file. It can also include the setting of a cue point such that the media files plays at a particular play point. If no customization is desired, the media file is directly transferred to step 403. Each file is independently operated so that one media file can be playing in a media player while the other media file is being modified with customizations.

Once the desired modifications, if any, are made upon the media files and each file is transferred to its respective media player, the dual play and/or mixing of the files generates an audiovisual playback or mashup at step 404. This dual playing can include the customizations made at step 402 as well as further modifications in real time as the files are being played. Any visual components can be visualized through the media screen.

Optionally, at step 405, the user is able to substitute another media file with one that is in play at step 405. Such substitution entails replacing an existing file with another file having been similar requested and received at step 401, customized at step 402, transferred to an appropriate media player at step 403, and played in order to generate an audiovisual playback. In alternative embodiments, additional files may be played in additional media players. When multiple files per media player are available, the files are arranged in a queue such that the user is able to switch from one file to another during live play if so desired.

At step 406, the user is able to share the audiovisual playback with other users and more broadly with the public. In one embodiment, the audiovisual playback is shared through a micro forum site. In other embodiments, the user is able to share the audiovisual playback with other media sharing sites such as FACEBOOK®, TWITTER®, and GOOGLE PLUS®.

At optional step 407, the user is able to record the audiovisual playback and further, optionally save the audiovisual playback at step 408. At the termination step at step 409, the user can either cease use or repeat the method.

Turning now to FIG. 5, an image of an exemplary system embodiment is shown, in accordance with an embodiment of the present invention. In this illustration, the audio "You've Got a Friend" is playing in the 2MP (502) while the PMP (501) image "Get Well Dog" is displayed in the media screen (505). The PMP/2MP thumbnail images (516, 517 respectively), image pans, and audio pans are displayed in the PMP file. The PMP/2MP IP is set to 100% PMP image. The PMP/2MP AP is set to 100% 2MP. The C&P (503) is loading "Elephant family reunion" video, the cue point is set to the start of the track, the pan radio button P/C is selected, the PMP/C&P AP is set to 100% PMP, and the PMP/C&P IP is set to 100% C&P (for transfer to 2MP). The "P" button is used to move media to the PMP. Selecting thumbnail plays media in PMP. The "2" button is used to open media in a new 2MP. The 'C' button opens the C&P (503). The "Make You Feel My Love" media file is shown in the playlist (504) with associated "P", "2", and "C" buttons.

Turning now to FIG. 6, an image of an exemplary embodiment of the system is shown. A "Get Well Soon" MIP image object (601) is shown in the media screen object and a MIP thumbnail of the "Get Well Soon" image is shown in the playlist. The MIP tool is illustrated with the "M" icon shown in the 12 o'clock default position on the circle around the "Get Well Soon" thumbnail image. The audio "You've Got a Friend" is playing in the 2MP (603). The "Social Networkjpg" image file in the playlist illustrates the "M" (602) DMP button used to open a new MIP. FIG. 6 also illustrates a preferred grouping order of DMP playlist objects: The PMP file is first (top of playlist scroll view), followed by the MIP, 2MP, and finally the C&P (bottom of grouping). The order of the playlist remains the same, only the files associated with 2MP, MIP and C&P are moved to accommodate this order. These files are returned to their previous position when a different file is called to take its place. The DMP objects are grouped adjacent to each other for ease of operation and to minimize playlist scrolling. The user can operate the PMP, MIP, 2MP, and C&P while viewing the media screen and with minimum or no scrolling of the playlist. Selecting a new multimedia file may require playlist scrolling, but once a new file is selected, the playlist re-sorts with PMP at top and DMP objects group below in the order previously described.

When a page is closed by a user, or when an audio or video track ends, the DMP system may exit. Similarly, when a period of inactivity is detected, such as an absence of keyboard strokes, mouse activity, or touchscreen activity, the system may exit.

According to an embodiment of the invention, a record button object is provided for recording a DMP mashup session. In a preferred embodiment, the record button is in the form of an 'REC' icon (506) displayed in the playlist (504). If a selector tool such as a mouse cursor hovers over the REC icon the following text may be displayed: "Record your GMash". However, one of ordinary skill will appreciate that any other suitable icon may be used for the record button, and any other suitable information, or no information, may be provided when the selector tool hovers over the record button. In addition, one of ordinary skill will appreciate that selecting a record button before start of DMP secession is not required to record. Thus, the 'REC' icon is not needed. This is because the DMP system can sense start and stop (no activity) of a DMP session and then display a dialog box with the option to save previous DMP session. To the end user, this appears as a record after the fact option.

In an exemplary embodiment, the record button is replaced with a stop button when the record button is selected (e.g., clicked or taped). After a period of inactivity, such as no media file playing, or a lack of user activity, recording automatically stops. Selecting the stop button also ends the recording session. When a recording session ends a dialog box opens. The dialog box includes a title field for titling the DMP mashup, a save button, a delete button, and a share button.

The DMP mashup is able to be shared through various social media sharing sites such as FACEBOOK®, GOOGLE PLUS®, and TWITTER® in a streamlined manner. In an embodiment, the DMP is configured to have direct access to such media sharing sites such that a copy of the created DMP mashup can be posted without the need for separately logging into such sites and uploading the DMP mashup. For instance, the pressing of a DMP button configured for FACEBOOK® instantly uploads the DMP mashup onto the user's FACEBOOK® profile. In another embodiment, a hyperlink of the DMP mashup is submitted for posting on such social media sites.

In another embodiment, the share button is configured to send a recorded mashup (in one embodiment by sending a hyperlink to the mashup) to the GMX (Group Mix) (511), an instant micro forum tool. GMX show is more fully described in U.S. patent application Ser. No. 13/627,048 (Network of Collaborative Online Shows) which is incorporated by reference herein in its entirety. Clicking the link in GMX opens and plays the DMP mashup in the PMP.

Recorded DMP mashups are listed in the playlist and labeled "GMash" by a user's name. A mashup creator hyperlink goes to 'Member's 'Vault' (512). Recorded DMP mashups are added to the creator's 'Media' (513) page with a link back to the GMX show. Recorded DMP mashups are tagged and may be added to a wiki media page for others to use in GMX and DMP mashups. Previously recorded DMP mashups are played and commented upon in the same manner as a video record. In certain embodiments, the system displays the same activity that took place during the DMP recording session (similar to a video screen capture). In this way, others can see how the DMP mashup was created. Recorded DMP mashups can be mixed live with other playlist media to create a new unique recorded DMP mashup.

In certain embodiments, the 2MP object does not have a 'Loop' button. To replay a 2MP selection the user must tap or click the start of the status bar, or slide the status bar slider button to the beginning. If a C&P is open, the user must pause or replay the 2MP selection before the track ends to prevent the C&P from closing current 2MP. If not, when the current 2MP media selection plays to the end, the C&P object is replaced by a new 2MP object and the old 2MP is closed.

In a preferred embodiment, there are visual difference between the 2MP object and the C&P object. For example, the 2MP object may have a green border and the C&P may have a blue border. In addition, the 2MP may have a "play" and "pause" button. The C&P may have a "P" and "2" button, and a cue point slider button, as previously described and shown in FIGS. 5 and 6. One of ordinary skill in the art will appreciate that many other suitable graphical forms could be used to distinguish the 2MP object from the C&P object beside those illustrated in FIGS. 5 and 6.

In a preferred embodiment, the 2MP thumbnail displays a still image or icon when the 2MP is not in "play" mode and a repetitive moving image such as a .GIF icon when the 2MP is in "play" mode. Similarly, a thumbnail of a 2MP video may use a still image or icon when not in "play" mode. When 2MP video is in "play" mode, the video plays in the thumbnail. Alternatively, the system displays a smaller more efficient animation, such as a moving .GIF file in the thumbnail.

In an alternative embodiment of the claimed invention, the DMP comprises a media screen (701), an overlay/underlay, a mixer (705), and a comments section (712). In this embodiment an optional cue and pass is not used, although it could be deployed. The mixer (705) contains the PMP (710), 2MP (704), AP (711), and their respective thumbnails. In this embodiment, audio and video media files are similarly controlled by the PMP and the 2MP as in other embodiments. Uniquely, however, here the media screen (701) contains multiple layers of various media files. For instance, the media screen (701) can contain an image overlay/underlay, a video controllable by the PMP, and/or another video controllable by the 2MP. In this embodiment, an image overlay can be displayed in the media screen while a video file is in play. Accordingly, the audio component of a video file can be heard (with any customization), possibly in combination with another video media file, but the visual component of the video files is replaced with an image overlay for view. In this alternative embodiment, an image overlay/underlay, a video controllable by the PMP, and/or another video controllable by the 2MP, can be move to the foreground or background using various selection methods. Because of this fact, loading and cueing can be executed in the background using either the PMP or the 2MP; thus eliminating the need for an optional cue and pass tool. Controls for this alternative embodiment are located in a playlist (702), the mixer (705), the media screen (701), and the comments section (712).

In an embodiment, an image overlay is projected over a video track in the media screen (701). In the preferred embodiment, to generate an image overlay, the user hovers over an image file thumbnail or title in the playlist (702). The user then selects the thumbnail (or title or an icon) from the playlist (702), and the overlay image is instantly displayed in the media screen (701). Alternatively, the user may select a paperclip icon (707) or media title (708) from the comment header (709) to instantly create an overlay image. When an image overlay is created, the text "overlay" is added under the files thumbnail in the playlist to indicate that the image file is an overlay. By selecting a new image in the same manner, a new image overlay replaces the original overlay.

Importantly, an image overlay does not change any customizations and/or audiovisual settings. An overlay simply covers video tracks. Overlays can be replaced at any time during the play of a video and/or an audio file. Potential images for overlay can be arranged in a queue in the playlist, or simply follow the current playlist order. The swiping of the media screen in a right or left direction can display the images in the queue or the current playlist order for overlay view. Swiping of the media screen from right to left displays the next available overlay from the queue or the playlist; swiping of the media screen left to right displays the previous overly from the queue or the playlist. One of ordinary skill in the art will appreciate that there are many other suitable interactive methods (e.g. tactile input, oral inputs) are also envisioned for placing or replacing an overlay image.

In the alternative embodiment, an image overlay can be converted into an image underlay. This is desirous when a certain portion of a video is preferred for viewing over an image. An image can shift from an overlay to an underlay any number of times during the play of a media file.

In the alternative embodiment, the mixer (705) controls the media screen (701), overlay/underlay, PMP (710), 2MP (704), and AP (711). Audio and video is passed from the playlist (702) to the mixer (705). In a desktop view, the mixer is located below a scrollable playlist. In a small screen view, the mixer is located at the footer of the media screen. In full screen mode, the mixer is relocated to footer of the media screen. In the full screen mode, the mixer is retractable after two seconds of non-use, provided the mouse pointer is outside of the retractable mixer area. However, the mixer does not retract as long as the mouse pointer remains inside the mixer area. DMP setting are retained when moving between the default mode and full screen mode.

The AP (711) is used to adjust PMP (710) and 2MP (704) balance (volumes of each media player are relative to each other). In the alternate embodiment, the AP slider button is located in the mixer. Sliding the button to the right and left increases or decreases the PMP and 2MP volumes in an inversely proportional manner. In specifics, the AP slider button at the extreme left may indicate that the relative volume is 100% in the PMP and 0% in the 2MP; AP slider button at the center indicates the relative volume is 50% PMP and 50% 2MP; and AP slider at the extreme right indicates the relative volume to be 0% PMP and 100% 2MP.

In the alternative embodiment, users are able to comment on selected media files. In one embodiment, hovering a selection tool over an icon in the playlist displays "Add Comments" or "Show Comments". Selecting "Show Comments" displays only the comments associated with the selected media file. By selecting "Add Comments", a comment dialog box opens. Once a user submits a comment, the comment is tagged to the selected media. When a comment is submitted for a media file, a paperclip icon (707) adjacent to the media title (708) is displayed in the header (709) of the media tagged comment in the comments section (712). Adding comments has no impact on the operation or performance of the DMP. When a media file is submitted during the posting of a comment, this comment is tagged to the submitted media file, the paperclip icon (707) is added to the comment, and the media file is added to the playlist (702).

The paperclip icon indicates that media is attached or tagged to a comment. In a certain embodiment, the user can select the paperclip icon or media title form the comment header to launch the media file and display the comments associated with the media file. Media selected in this manner is handled as if it were selected from a media file thumbnail (713) in the playlist (702). A variety of different icons can be used in place of the paperclip icon to indicate the type of media file.

To initialize the DMP in the alternative embodiment, the system loads the media screen, the playlist, the comments section, and the mixer. The system may add a cover image to the media screen, and media files to the playlist and the mixer; at this point (regardless of content inserted by the system) more media files may be added by the user. After close of system, content and system state may be retained so that when re-opened the DMP returns to previous state. Alternatively, after close of GMX, if new content is contributed by others, upon re-opening the GMX the mixer may load the most recent media files to the PMP and the 2MP. Upon initial loading, the AP slider is set so that relative volume is 100% PMP and 0% 2MP. Once initialized, users can add content and modulate functionality without disrupting the DMP state.

In the alternative embodiment, the PMP and 2MP may require active input to replay a media file. For instance, a user has to select "play" to replay the existing media file since the media player default setting is set to not loop. However, this lopping function may be adjusted.

In the alternative embodiment, the user is able to open the DMP through a social billboard mode. For instance from the GMX page, the user is able to open and share the DMP mashup in said social billboard mode by selecting a GScreen mode button (706), thereby allowing viewing of the DMP mashup in public areas. Through network connected display units (computers, smart TVs, tablets, smart phones, projectors) available in public space, the mashups are communicated to such display units for public viewing. Accordingly, even individuals that are not connected by wireless or cellular means are able to view DMP mashups selected for public display. Multiple users are able to display their mashups by each user sharing his/her creation through the GMX page. By doing so, mashups by multiple users are displayed in the GScreen mode, thereby creating a mashup show or presentation.

GScreens can be controlled by a user referred to as a "director". The director is thus able to manipulate content to produce live DMP mashups or adjust GScreen mode settings. Anyone in control of the public screens can be the director, because there is no prerequisite or requirement to be a director (this is the default, however a system administrator may adjust the system so as to require permission to direct). Using DMP in GScreen mode is an excellent way to DJ a party. Here, the director is a DJ because he controls sound, video and images in real-time. All this, while new media tagged to user generated comments are posted to the GMX onto said playlist by the audience for the director to DJ. The addition of new media and accompanying comments do not disrupt or interfere with the operations of any media player. Therefore, media players may continue play as normal or new media files through a previously inactive media player may be opened without interference from and to the GScreen mode.

The system administrator has the capability to remove a user's access and director controls of the DMP. In doing so, the system administrator can assume director control, or if desired, assign another user with director controls. The system administrator may require authentication from the substitute user before transferring director controls.

In an embodiment of the claimed invention, a system administrator may control the DMP broadcasting or output/input means of the mashups. Broadcasting of the DMP mashup includes any means of mass communications distribution media including radio, television, cable radio, direct-broadcast satellite, and webcasting. Regulating the output distribution of DMP creations allows the system administrator or director to broadcast his/her own multimedia show whether or not a user enables a social billboard mode. Regulating the output and an input distribution allows for a collaborative DMP creation between one or more said system administrators, one or more directors, or one or more users for public or private consumption.

When DMP mashups are displayed through GScreen mode, the DMP settings are retained. In one embodiment, the display of the mashup appears as a full screen mode, while the director's controls are retractable and/or hidden from view.

Recorded mashups are automatically played in the GScreen mode in auto-play, unless otherwise controlled by the director. In one embodiment, there are two auto-play configurations: (1) media auto-play and (2) comments auto-play.

The media auto-play presents images and muted video clips. Muted video clips are displayed to avoid disruptive sounds from the GSscreen mode. For instance, it is disruptive if a DMP mashup consisting of an image with no sound is followed by a video with loud, booming sound. Since the GScreen mode is intended for public display (although private viewing is also possible), this could cause disruptions in public spaces. Accordingly, a DMP mashup consisting of sounds and video clips is displayed in a mute mode for certain duration. If desired, a director can play the full length video with sound. In certain embodiments, the muted video clips are treated as overlays/underlays within the DMP.

The comments auto-play, presents comments and such comments' replies in a comments section. The comments are sourced from GMX. In one embodiment, the comments are displayed in reverse-chronological order such that new comments are inserted at the top of the comments list.

In the alternative embodiment, the PMP (710) plays audio and video files. To load the PMP (710), the user can select a thumbnail (713) or a "P" button (714) from the playlist (702). The playlist (702) contains media files. A "P" inside a box (717) indicates the playlist media currently loaded into the PMP. Other means of accessing the PMP can be through the paperclip (707) or media title (708) from the comment header. In this embodiment, the PMP controls are located within the mixer (705). The mixer can be retractable and hidden from view when used in full screen mode.

In certain embodiments, a view of a media file for play in the media players is displayed as thumbnails in the mixer. If the media file is an audio file, the thumbnail view can be projected as a still image or an icon when not in play mode; and the thumbnail can be projected as a moving GIF icon in play mode. If the media file is a video file, the thumbnail view can be projected as a still video cover image or icon when not in play mode; in play mode the video can be played within the thumbnail or a GIF version of the video can be displayed. If a media player's video is not displaying in the media screen, selecting said media player's thumbnail will display said video in the media screen. If a media player's video is displaying in the media screen, selecting said media player's video thumbnail will convert an underlay to overlay and display said overlay in the media screen. Selecting media player's thumbnails has no other effect on the DMP settings. In this manor, the DMP operator can toggle between overlays and PMP and 2MP videos in an effective way.

If an audio or a video file in the PMP (710) of the alternate embodiment is selected, a previously selected media playing in the PMP is closed unless it is identical to the newly selected file. In one embodiment, the media (audio and/or video) begins to play automatically (i.e., by selecting a media thumbnail in the playlist or a paperclip icon in a comment) while in other embodiments, a user is required to press a "play" button. Upon selecting a video file thumbnail in the playlist or a video file paperclip icon in a comment, the AP is set to 100% PMP, the said video is played by the PMP and the 2MP media file is paused, although all other settings are retained. Upon selecting an audio file thumbnail in the playlist or an audio file paperclip icon in a comment, the AP is set to 100% PMP, the said audio is played by the PMP, the 2MP is paused if the 2MP contains an audio file, or muted if the 2MP is a video, although all other settings are retained. If the media file selected in the previous manor is an audio file and a video file is being played in the 2MP, the 2MP video remains viewable in the media screen without interruption or disruption of the 2MP settings. If the media file selected in the previous manor is a video file and a 2MP video is viewable in the media screen, the 2MP video is converted into a background layer and the newly open file is presented in the media screen as a foreground layer. If an image overlay is present when an audio file is opened, the overly is retained. If a previous PMP video was viewable in the media screen, it is replaced with the newly selected PMP video. Selecting the "P" button from the playlist passes the media file (audio or video) to the PMP in pause mode, thereby requiring the use of the "play" button.

The 2MP (704) of the alternate embodiment is able to play both audio and video media files. Controls for the 2MP are located within the mixer (705). To select a file for play in the 2MP, a user selects "2" button (715) from the playlist (702) to pass media from the playlist to the 2MP. A "2" inside a box (716) indicates the playlist media currently loaded into the 2MP. The newly selected media file replaces the previously selected 2MP media file.

In order to view a 2MP video file in the media screen (701), the user selects the right thumbnail from the mixer (2MP thumbnail). If there is an overlay in the media screen, it is converted into an underlay. If there is a PMP video in the media screen, it is converted to a background layer. A second selection of said 2MP thumbnail converts underlay to overlay, a third selection returns the 2MP video file to the media screen, play status and other settings are retained.

In the alternative embodiment, it should be apparent to those skilled in the art, that the Image Pan (IP) and the Multiple Image Pan (MIP) previously described, may be configured to pan multiple layers, overlays, and underlays of various media files and display these transitions in the media screen (701).

Figure 8:
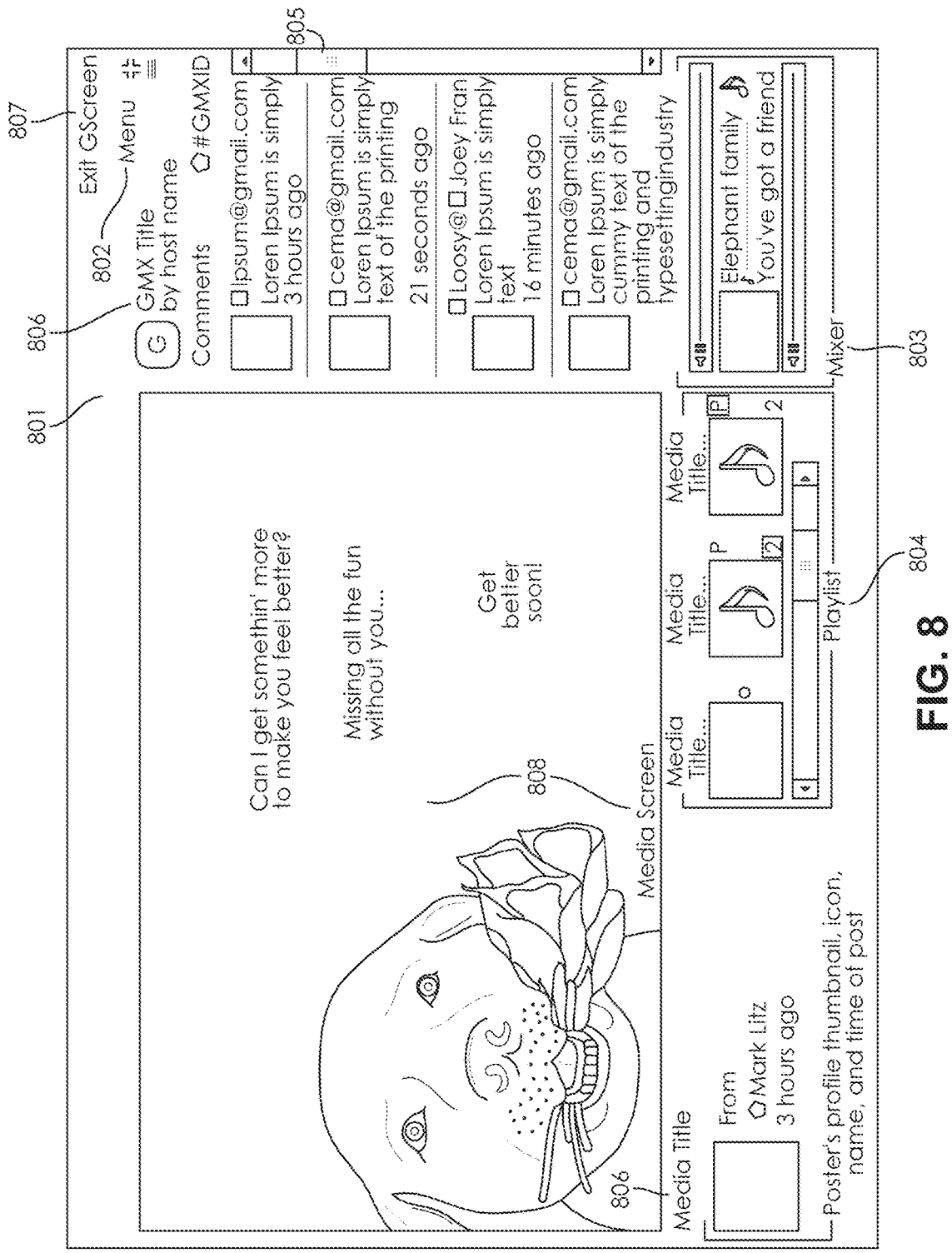
FIG. 8 is an image depicting a screen shot of a web page showing an exemplary embodiment of the present invention.

In an embodiment the GScreen feature of the claimed invention has retractable director controls. As illustrated in FIG. 8, the GScreen (801) includes a media screen (808), a menu button (802), the media title (806), the mixer (803) enabling control of the PMP and 2MP, a playlist (804), a comment section (805) and an exit feature (807).

In an embodiment of the GScreen, the playlist (804) is comprised of a retractable horizontal scroll bar. By scrolling, various media titles and thumbnail representations of media files are display. Accompanying the media titles are also DMP buttons such as "P" and "2" to enable playing of the media files through the desired media players for view on the media screen.

In an embodiment of the GScreen, the comment section (805) is comprised of a retractable vertical scroll bar. In the comment section, a profile picture of a user is displayed. Each text comment is accompanied by a source icon indicating from where the comment was originally posted (e.g. GATHERTIME™, FACEBOOK®, GOOGLE PLUS®, or TWITTER®).

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for creating live multimedia mixing compositions comprising:
   a dynamic media pairing module, comprising computer-executable code stored in non-volatile memory,
   a processor, and
   a communication means,
      wherein said dynamic media pairing module is further comprised of at least a primary media player and a second media player, a cue and pass, a playlist, and a media screen,
      wherein each media player is configured to independently perform play mode operations of one or more media files without affecting play mode operations of another said media file,
      wherein said play mode operations include queuing one or more media files for play within each media player,
      wherein said primary and secondary media players are configured to play said media files simultaneously,
      wherein said media file comprises content of text, audio, still images, photographs, animation, video or interactivity forms,
      wherein said media screen is configured to queue at least one media file while another media file is in play in said media screen,
      wherein said playlist displays media files to be selected and played in said primary or second media player,
      wherein said playlist displays media files to be selected and loaded into said cue and pass,
      wherein said cue and pass is configured to pass media into said primary media player and said secondary media player and permit customization of audiovisual mixing parameters and further configured to communicate said audiovisual mixing parameters to said primary media player and said secondary media player,
      wherein said dynamic media module, said processor, and said communications means are operably connected and are configured to:
      request and receive a first and a second media file for selection,
      allow a user to individually customize said audiovisual mixing parameters and play instructions of said media files within said cue and pass object,
      transfer via said cue and pass object said first media file with desired customization and play instructions to the primary media player and transfer said second media file with desired customization and play instructions to the second media player,
      generate an audiovisual playback of a combination of said customized first media file and said customized second media file through the dual play or mixing of said first media file and second media file,
      allow a user to substitute said first or second media file with another media file during the audiovisual playback.

2. The system for multimedia mixing of claim 1, wherein said media screen is able to queue at least two media files while at least one media file is in play.

3. The system for multimedia mixing of claim 1, wherein said media screen includes a touch interface and is adapted to detect various swipe gestures and perform the function of switching a media file currently in display with a media file from said playlist, said primary media player, said second media player, or said cue and pass to display.

4. The system for multimedia mixing of claim 1, wherein said mixing parameters include tools for establishing cue points and setting image and audio panning in a forward, reverse, and scrubbing directions, and further for setting panning of multiple images.

5. The system for multimedia mixing of claim 1, wherein said dynamic media module is further configured to permit customization of audiovisual mixing parameters in real time while said one or more media files are in play or pause mode.

6. The system for multimedia mixing of claim 1, wherein said dynamic media module is further comprised of additional media players such that an audiovisual playback may be generated by three or more media files in a play mode.

7. The system for multimedia mixing of claim 1, wherein said dynamic media module is further configured to record and save said audiovisual playback.

8. The system for multimedia mixing of claim 1, wherein the dynamic media module is further configured to be shared by generating a computer-readable hyperlink of said playback and sending said hyperlink to a website or a mobile app for the sharing of media and communications.

9. The system for multimedia mixing of claim 1, wherein said dynamic media module is further configured to repeat and replay said media file.

10. A method for creating live multimedia mixing compositions comprising:
requesting and receiving a first and a second media file for selection,
allowing a user to individually customize audiovisual mixing parameters and play instructions of said media files within a cue and pass object,
wherein said cue and pass is configured to load and pass media into said primary media player and said secondary media player and permit customization of audiovisual mixing parameters and further configured to communicate said audiovisual mixing parameters to said primary media player and said secondary media player,
transferring via said cue and pass object said first media file with desired customization and play instructions to a primary media player and transfer said second media file with desired customization and play instructions to a second media player,
generating an audiovisual playback of a combination of said customized first media file and said customized second media file through the dual play or mixing of said first media file and second media file on a media screen, and
allowing a user to substitute said first or second media file with another media during said audiovisual playback,
wherein each media player is configured to independently perform play mode operations of one or more media files without affecting play mode operations of another said media file,
wherein said play mode operations include queuing one or more media for play within each media player,
wherein said primary and secondary media players are configured to play said media files simultaneously,
wherein said media file comprises content of text, audio, still images, photographs, animation, video or interactivity forms,
wherein said media screen is configured to queue at least one said media file while another said media is played in said media screen,
wherein said first media file or said second media file may be substituted by another media file in queue during the audiovisual playback, and
wherein a playlist plays media files to be selected and loaded onto said cue and pass.

11. The method for multimedia mixing of claim 10, wherein said media screen is able to queue at least two media files while at least one media file is in play.

12. The method for multimedia mixing of claim 10, wherein said media screen includes a touch interface and is adapted to detect a swipe gesture and perform the function of switching a media file currently in display with a media file from said playlist, primary media player, second media player, or the cue and pass to display.

13. The method for multimedia mixing of claim 10, wherein said media file is uploaded or already preloaded onto said dynamic media module.

14. The method for multimedia mixing of claim 10, wherein said mixing parameters include tools for establishing cue points and setting image and audio panning in a forward, reverse, and scrubbing directions, and further for setting panning of multiple images.

15. The method for multimedia mixing of claim 10, wherein said dynamic media module is further configured to permit customization of audiovisual mixing parameters in real time while said one or more media files are in play or pause mode.

16. The method for multimedia mixing of claim 10, wherein said dynamic media module is further comprised of additional media players such that an audiovisual playback may be generated by three or more media files in a play mode.

17. The method for multimedia mixing of claim 10, wherein said dynamic media module is further configured to record and save said audiovisual playback.

18. The method for multimedia mixing of claim 10, wherein the dynamic media module is further configured to generate a computer-readable hyperlink of said playback and send said hyperlink to a website or a mobile app for the sharing of media and communications.

19. The method for multimedia mixing of claim 10, wherein said dynamic media module is further configured to repeat and replay said media file.

20. A system for creating live multimedia mixing compositions comprising:
a dynamic media pairing module, comprising computer-executable code stored in non-volatile memory,
a processor, and
a communication means,
wherein said dynamic media pairing module is further comprised of at least a primary media player and a second media player, a mixer, a playlist, and a media screen,
wherein each media player is configured to independently perform play mode operations of one or more media files without affecting play mode operations of another said media file,
wherein said play mode operations include queuing one or more media files for play within each media player and play on said media screen,
wherein said primary and secondary media players are configured to play said media files simultaneously,
wherein said media file comprises content of text, audio, still images, photographs, animation, video or interactivity forms,
wherein said media screen is configured to queue at least one media file for play while another media file is in play,
wherein said playlist displays media files to be selected and played in said media screen, primary or second media player,
wherein said mixer is configured to contain controllers for the primary media player, the second media player, and further configured to contain customization controls regulating the relative audiovisual parameters of each media file in each media player,
wherein said dynamic media module, said processor, and said communications means are operably connected and are configured to:
request and receive a first and a second media file for selection,
allow a user to individually customize said audiovisual mixing parameters,
transfer said first or second media file to the media screen for display, generate an audiovisual playback of a combination of said first media file and said second media file through the dual play or mixing of said first media file and second media file,
- wherein the second media file is configured to be executed as a background to the first media file,
- wherein the second media file executed as a background may be converted to the foreground for display, thereby converting the first media file in play at the foreground to the background,
- wherein a media file for display in said media screen may be overlaid by an alternative media file such that the media file originally in display ceases to play and is transferred to a media screen queue,
- wherein said first media file or second media file may be substituted by another media file in queue during the audiovisual playback.

21. A system of multimedia mixing of claim 20, wherein the dynamic media pairing module of claim 20 is further configured to permit a system administrator to regulate output and input of said audiovisual playbacks to the general public.

22. The system for multimedia mixing of claim 20, wherein said dynamic media pairing module is further configured to open through a social billboard mode connected to a network of inter-communicating display units.

23. The system for multimedia mixing of claim 22, wherein said dynamic media pairing module is configured of independently receiving new media tagged to user generated comments and insert said new media into said playlist without interfering with one or more operations of said media players or display of said audiovisual playback.

24. The system for multimedia mixing of claim 22, wherein at least one administrator may set system access levels, prerequisites or requirements for at least one operator to use said system.

25. The system for multimedia mixing of claim 22, wherein at least one administrator may remove director control of system from an operator, and assume director control, or pass control to another director with proper authentication.

* * * * *